(12) United States Patent
Saillet (10) Patent No.: US 8,112,473 B2
(45) Date of Patent: Feb. 7, 2012

(54) METHOD FOR THE SERVER SIDE PROCESSING OF USER INTERACTIONS WITH A WEB-BROWSER

(75) Inventor: Yannick Saillet, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 1224 days.

(21) Appl. No.: 11/377,503

(22) Filed: Mar. 16, 2006

(65) Prior Publication Data

US 2006/0212514 A1 Sep. 21, 2006

(30) Foreign Application Priority Data

Mar. 17, 2005 (EP) .................................. 05102110

(51) Int. Cl.
*G06F 15/16* (2006.01)
*G06F 17/27* (2006.01)
*G06F 17/22* (2006.01)

(52) U.S. Cl. ........ 709/203; 709/201; 709/202; 715/205; 715/234; 715/240; 715/243; 715/246

(58) Field of Classification Search .......... 709/201–203; 715/234, 240, 205, 243, 246
See application file for complete search history.

(56) References Cited

U.S. PATENT DOCUMENTS

| | | | | |
|---|---|---|---|---|
| 5,894,554 A * | 4/1999 | Lowery et al. | ................ | 709/203 |
| 6,052,730 A * | 4/2000 | Felciano et al. | ............. | 709/225 |
| 6,239,797 B1 * | 5/2001 | Hills et al. | .................... | 715/784 |
| 6,266,684 B1 * | 7/2001 | Kraus et al. | .................... | 715/209 |
| 6,594,691 B1 * | 7/2003 | McCollum et al. | ........... | 709/218 |
| 6,701,368 B1 * | 3/2004 | Chennapragada et al. | ... | 709/228 |
| 6,760,750 B1 * | 7/2004 | Boneh et al. | .................. | 709/204 |
| 6,785,891 B1 * | 8/2004 | Allen et al. | .................... | 719/313 |
| 6,901,554 B1 * | 5/2005 | Bahrs et al. | .................... | 715/210 |
| 6,983,421 B1 * | 1/2006 | Lahti et al. | ..................... | 715/763 |
| 7,216,300 B2 * | 5/2007 | Dang | ............................ | 715/783 |
| 7,246,314 B2 | 7/2007 | Foote et al. | | |
| 7,246,324 B2 * | 7/2007 | Mikhail et al. | ................ | 715/760 |
| 7,287,227 B2 | 10/2007 | Ries et al. | | |
| 7,293,034 B2 * | 11/2007 | Paya et al. | ............. | 707/999.101 |
| 7,464,381 B1 * | 12/2008 | Nickerson et al. | ............ | 719/311 |
| 7,523,401 B1 | 4/2009 | Aldridge | | |
| 2002/0007393 A1 * | 1/2002 | Hamel | ......................... | 709/203 |
| 2003/0164859 A1 * | 9/2003 | Evans | .......................... | 345/792 |
| 2004/0177147 A1 * | 9/2004 | Joshi et al. | .................... | 709/227 |
| 2005/0097557 A1 | 5/2005 | Bradfield | | |
| 2005/0108390 A1 * | 5/2005 | Nickerson et al. | ............ | 709/224 |
| 2006/0168540 A1 * | 7/2006 | Cejka et al. | ................... | 715/786 |
| 2007/0226613 A1 * | 9/2007 | Tandriono et al. | ............ | 715/530 |

* cited by examiner

*Primary Examiner* — Melanie Jagannathan
*Assistant Examiner* — Kai Chang
(74) *Attorney, Agent, or Firm* — Toler Law Group (57) ABSTRACT

The present invention relates to a method and system for client-side interacting with a server-side web application in a web-based client-server environment, in which a client-side web browser is used as a user interface for displaying web pages sent by the web application within a browser application frame and for converting events triggered by one or more user actions within said application frame into a request directed to said server-side web application, wherein an executable program object for example a Java Script is used at the client side as a part of the client-side web application user interface.

In order to improve the user interface it is proposed to use an additional frame in the browser which communicates with the server and which prevents the displayed document from being reloaded when the server sends its response. Instead, only delta information (50) is displayed within the frame.

15 Claims, 5 Drawing Sheets

METHOD FOR THE SERVER SIDE PROCESSING OF USER INTERACTIONS WITH A WEB-BROWSER

CLAIM OF PRIORITY

Pursuant to 35 U.S.C. §119, this application claims priority of European Patent Application No. 05102110.3, filed on Mar. 17, 2005, and entitled, "A Method for the Server Side Processing of User Interactions with a Web-Browser," which application is hereby incorporated by reference in its entirety.

1. BACKGROUND OF THE INVENTION

1.1 Field of the Invention

The present invention relates to computer applications and in particular to a method and respective system for client-side interacting with a server-side web application—and vice versa—in a web-based client-server environment, in which a client-side web browser is used as an application user interface.

1.2. Description and Disadvantages of Prior Art

In such environments, traditionally a web browser is used for displaying web pages sent by the web application within a browser application frame and for converting events triggered by one or more user actions within said application frame into a request directed to said server-side web application. As the browser functionality is small compared to stand-alone applications this web user interface may be considered as a "light" version compared to the user interface operated by a stand-alone application without an interconnected web connection.

Figure 1:
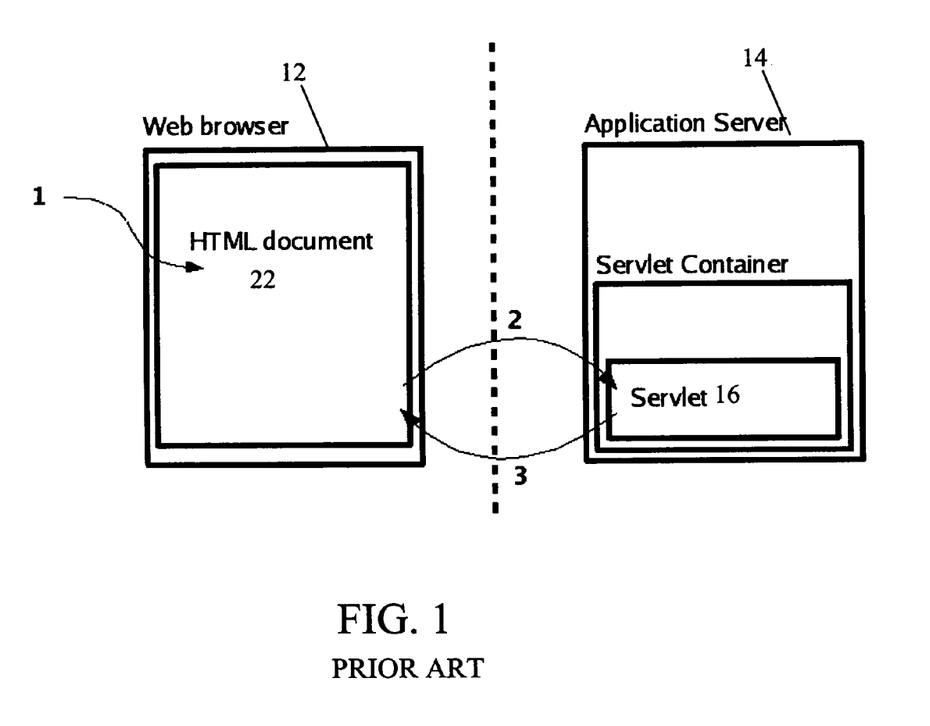
FIG. 1 is a schematic prior art system diagram showing basic structural and functional elements thereof.

With reference to FIG. 1 a prior art web-application involving a web-browser 12 as "light" client having a low-level functionality user interface and an application server 14 hosting the application, suffers from a lack of interactivity with the user and from difficult programming models.

Typically a prior art web application works as follows:

On a user action 1 as e.g., clicking on links, pressing buttons, pressing some keys, or activating any interactive component on the page, the web browser 12 makes a request to the server by sending—see reference sign 2—a HTTP request pointing to a URL. Possibly, a set of parameters to be interpreted by the server 14 may be passed with the HTTP request. These parameters may contain information about the interaction the user did on the page and can be passed to the server either as URL-encoded parameters in an HTTP GET request or as data in the body of an HTTP POST request.

This request is processed by a servlet 16 or a JSP which generates an HTML document and sends it back to the web-browser—see reference sign 3.

The HTML document generated by the servlet 16 typically contains links or interactive formular elements with links to other URLs, either to different servlets/JSPs, or to the same servlet 16 with different parameters.

When the user clicks on one of these interactive elements, the browser is redirected to the new URL.

A new HTTP request is sent to the server, which generates a complete new HTML document and sends it back to the browser. The new document replaces the old one, and by that loops 1, 2, 3, the application workflow is run through by this kind of processing user inputs.

However, there are several drawbacks to this general prior art approach:

First, since each user-interaction reloads the whole document, there is a long time delay between the user interaction and the visual response from the application: the whole document has to be transmitted through the network, it has to be displayed again by the browser. Thus it is not possible to build highly-interactive user interfaces, where a large number of user events (mouse events for instance) can be processed by the server 14.

Second, the programming model to realize such applications is complex. Since each user interaction leads to the replacement of the current document with a new document, the logic of the web application program becomes complicated, as current status information about the current session has to be passed to the server in order for being used in the new document.

Third, the programming model of a Web application is completely different from the programming model of a standalone application:

In a standalone offline application, user interface logic can be implemented within a single panel by listening to the events coming from the elements of the panel and responding with property changes in other elements of the same panel (for instance: when button A is clicked, the color of the text B is changed.

In a web application, every user-triggered event is associated with the generation of a new document.

This makes standalone application impossible to be ported to a web application without a complete reengineering of the user interface.

The reason for this drawback is found to be the technical limitations of the client side:

Web browsers were originally designed to display static content (text and images). Thus they offer very limited programming capabilities. Although numerous plug-ins have been developed to enhance the capabilities of the web browsers, browsers are basically still simple client software that can only send requests to a web server and display the returned documents.

To compensate this lack of capabilities of the Web browsers, several specific prior art solutions have been developed until here by the industry, comprising an executable program object for example a Java Script, which is used at the client side as a part of the client-side web application user interface. Examples for this executable code are:

First to be mentioned are JavaScript (or ECMAScript) and Dynamic HTML (DHTML): with this prior art technology a scripting language can be used to modify the content of the displayed document. The script has to be defined in the document loaded by the Web browser. The execution of the script is made by the browser itself. Thus, the server prepares the script, sends it to the browser, but as soon as the document is displayed in the browser, the server has no influence anymore on it.

Second, Java applets: with this specific prior art technology complete Java programs are downloaded on the client and executed in the browser.

These approaches have, however, considerable drawbacks: JavaScript, which is a registered trademark of Sun Microsystems Inc., allows modification modify "on-the-fly" of elements of the displayed document without having to reload the whole document, but the scripts implementing this user interface behaviour have to be fully defined in the original document downloaded from the server. Once the document is loaded, the server does not interact anymore with the user interface and the logic can't be modified until a new document is loaded.

The latter Java applets are very flexible and can open additional communication channels with the servers, but disadvantageously the whole code of the application to execute has to be downloaded to the client and executed by the browser.

This involves also some considerable problems, for instance due to the required download time of the code, risky security issues, and due to the compatibility with the Java virtual machine used by the browser.

Again with reference to FIG. 1, if the user interaction 1 can be processed locally—if the reaction to this interaction is already defined in the JavaScript sent with the HTML document—, the scripts statically embedded in the page can process it and the process stops here. But this is not a satisfying solution due to the reasons described above.

Because of these drawbacks, web applications are still limited to components with a low interactivity, i.e., they generally include text fields, buttons, links in their user interface.

For example, applications using complex mouse interactions, as for instance drag and drop of elements, are difficult to realize.

1.3. Objectives of the Invention

It is thus an objective of the present invention to alleviate the disadvantages of prior art.

2. SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims. The basic idea of this invention comprises the approach to use an additional frame in the browser which communicates with the server and which prevents the displayed document from being reloaded when the server sends its response.

According to this basic approach a method and respective system for client-side interacting with a server-side web application in a web-based client-server environment is disclosed, in which a client-side web browser is used as a user interface for displaying web pages sent by the web application within a browser application frame and for converting events triggered by one or more user input actions within said application frame into a request directed to said server-side web application, wherein a client-server request-response communication dialogue is performed stepwise with said server-side web application (16) responsive to said user input actions,
which method is characterized by:
performing in a single dialogue step between client and server the steps of:
a) receiving an executable display programming means in a user-hidden frame—herein called "mediator frame" together with response parameters generated by the server,
b) executing said display programming means from within the user-hidden frame, wherein said execution displays said response parameters at said application frame for updating it only in part at predetermined locations.

An executable program object, be that the "second executable programming means 28" used for display purposes or the "first executable programming means 26" used for input-sensing purposes, as mentioned later below, may be for example a Java Script or a Java Applet, or a VB-Script (Visual Basic script supported by MS-Internet Explorer), or any other suitable program object.

Advantageously, the client-side "user-hidden" mediator frame is a frame, which has the following properties:

It is fully invisible to the user or at least quite small such that it does not attract the user's attention.

It does not display any visual information to the user; it should preferably be fully hidden.

It sends to the server the HTTP requests prepared by the application frame and receives the answer of the server to this request, instead of the application frame itself as usual in prior art.

It executes the result of the server and modifies only the content of the application frame, without changing the rest of the frame image.

This frame is called in here a mediator frame, because it realizes the communication between the application frame and the server. It sends the requests of the application frame to the server, receives and interprets the answer of the server: thus, it acts as a mediator in all communications between application frame and server.

The mediator frame should advantageously be user-hidden, in order to seamlessly integrate the inventional method into commonly used user interfaces.

The present invention discloses a method and respective system, which allows to capture user events, i.e., key and mouse events, on a web browser, to transmit these events to the server, to let the server interpret these events and compute a response which is sent back to the browser. The response can modify a part of the document displayed on the browser, without requiring the reloading of the whole document.

The advantages of this approach are:

It allows a fine grained response from the server to UI events, without having to reload the document between each event. The data exchanged between the client and the server is compact since only the modifications to make to the document are sent to the client, instead of the whole document, which leads to a better performance and allow more client/server interactions. This is what is meant by "content-focused" communication according to the wording herein.

By that the logic of the web application stays of the server, which saves traffic on the network and increases security of the client application. Only visual information is sent to the browser. This is a further step against piracy.

The web application is run on the server. The browser is only used to display the user interface. Thus resources of the server can be leveraged.

The inventional method can be used with usual browsers, without having to install a specific plug-in. There is no incompatibility issue as it is present with Java applets and the different Java versions.

BRIEF DESCRIPTION OF THE DRAWINGS

The present invention is illustrated by way of example and is not limited by the shape of the figures of the drawings in which.

DETAILED DESCRIPTION OF THE PREFERRED EMBODIMENT

Figure 2:
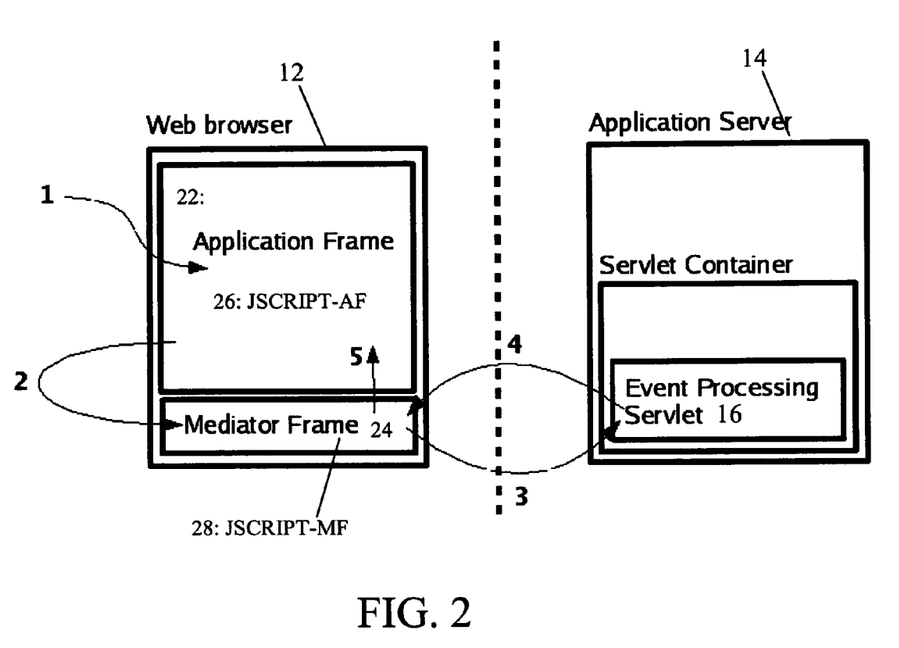
FIG. 2 is a schematic inventional system diagram showing basic structural and functional elements according to a preferred embodiment thereof.

With general reference to the figures and with special reference now to FIG. 2 two different frames are used at the browser:

First, an application frame 22 is used to display the web application and interact with the user. The document displayed in this frame should be a document which allows to capture user interaction and to be dynamically modified with JavaScripts, preferably or typically, a document implementing the Document Object Model Level 2 (DOM2) specifications will be used. For example a DHTML document, or a Scalable Vector Graphic—SVG, or a XUL (User Interface Language, used in Mozilla Browser), or any XML based document can be alternatively used.

It should be annotated that DOM2 is selected because it represents a platform- and language-neutral interface, recommended by the W3C consortium, which allows programs and scripts to dynamically access and update the content and structure of documents.

Second, according to this preferred embodiment a mediator frame 24 is used to communicate with the servlet 16 of the application server 14. The mediator frame 24 should remain hidden, for instance by setting its width/height to zero. According to the invention the user is advantageously not supposed to interact with it or even notice that it exists in order to keep the user interface simple. The user only interacts with the application frame. Thus, in contrast to said mediator frame, the application frame 22 can also be considered as a "displaying" frame in the inventional context, as any content is displayed to the user within this frame 22.

The document displayed in the application frame 22 uses a minimal JavaScript 26 ("first executable input-sensing programming means") which detects and senses the user interactions, see arrow 2, encodes them into an URL to the servlet controlling the application, and invokes (again arrow 2) the mediator frame 24 to send—arrow 3—a request with this URL. The mediator frame gets the answer from the server including an executable program means, for instance a Java Script 28 denoted as JSCRIPT-MF (JavaScript for Mediator Frame), see arrow 4—and executes it. By this execution the new content calculated at the server is displayed at the application frame, see arrow 5. Thus the workflow of the application is progressed without loading a new HTML document. Only the really new information relevant for the user to see, is updated in the application frame 22.

It should be noted that an alternative to above step of invoking the mediator frame 24 to send a request with above URL, is that the application frame sends the request to the server and the request indicates that the answer should be sent to the mediator frame. This would be in particular the case if the chosen implementation uses HTTP-POST requests to communicate with the server:

With an HTTP-GET request (data limited to 4 Kb), the flow would be as follows:

First, encoding parameters into an URL, and then "asking" the mediator frame to load the document as this URL.

Second, with an HTTP-POST request (no size limitation), the application frame will typically prepare the request with an hidden formular and send the request itself by indicating that the response should go to the mediator frame.

In both cases, the request is prepared by the application frame itself, because the mediator frame should contain as little logic as possible, because it is reloaded at each interaction. The only difference between both methods is how the request is sent to the server.

Figure 3:
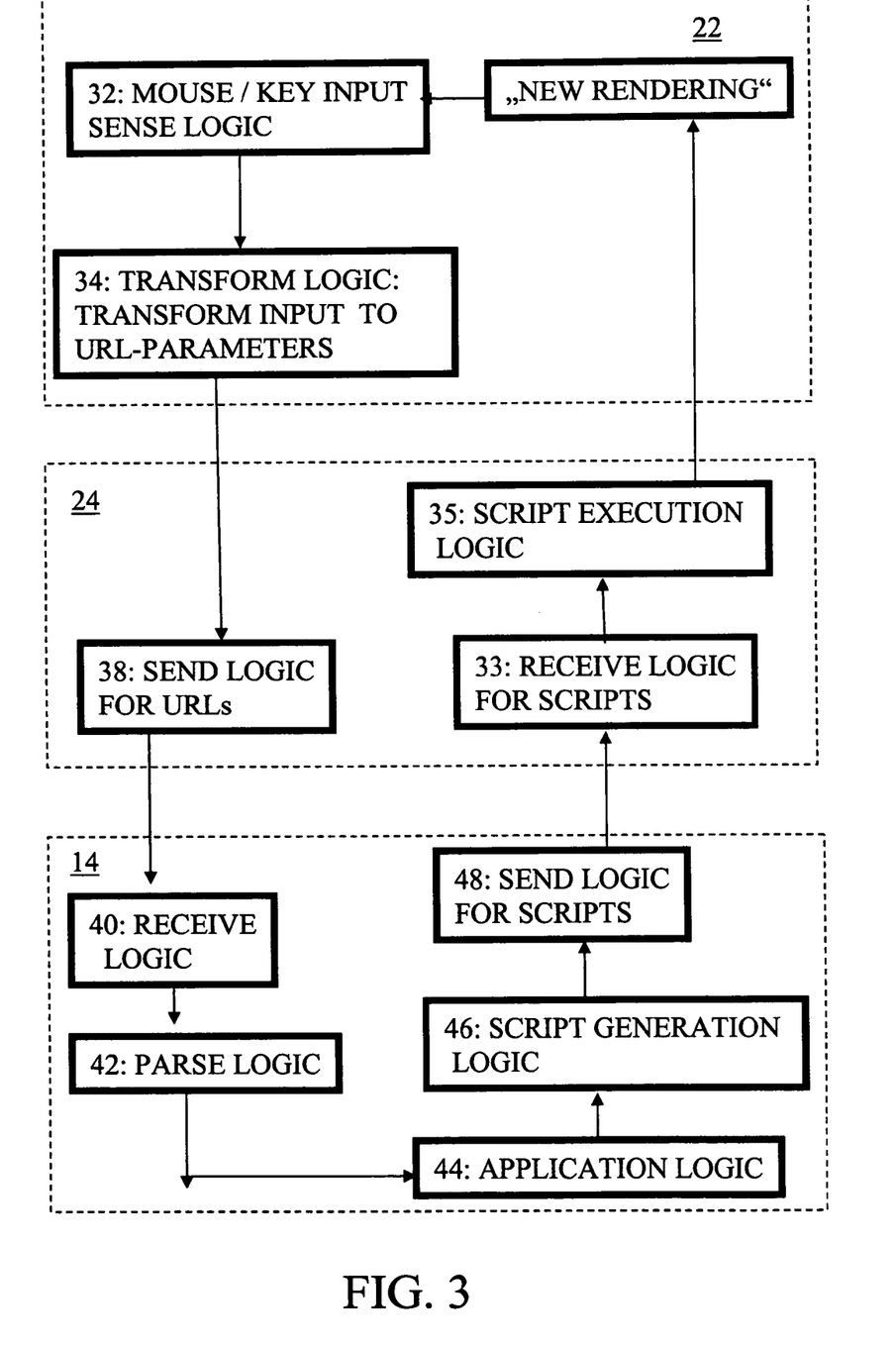
FIG. 3 is a schematic diagram illustrating the basic logical elements of an application frame (top), a mediator frame (centre), and server logic (bottom) and respective interfaces according to a preferred embodiment of the invention.

FIG. 3 depicts structural details of application frame 22 and mediator frame 24. The main task of the mediator frame is to send the request to the server and avoid the document on which the user works from being replaced or reloaded. The application frame provides logic for preparing that. The logic blocks of both frames relevant for the present invention cooperate as follows:

Application frame 22 comprises a sense block 32, which senses and collects any events, i.e., done by the user to user controls of the frame via key or mouse input. Event characteristics comprise the event type, mouse coordinates, key pressed, etc.

Further a transform logic 34 is provided, which transforms said event characteristics to text-based key-value pairs, which can be stored in the HTTP request, as for example:

eventType=mouseDown, screenX=100, screenY=150, mouseButton=1

According to a preferred feature of the present invention this transformation is independent from the content of the page, as it works unlike to prior art, as schematically shown next below:

Prior art web application logic-typified:
"if Button1 is clicked, go to URL XY"

Inventional web application logic-typified:
"if ANY button is CLICKED, put the key-pair value "eventType=ButtonClick, eventTarget=% ID_of the_button, _where_the_event_occurred, as parameters into the request to be sent. This is applicable independently from the button which was currently clicked.

Thus, a list of text parameters is passed from application frame 22 to mediator frame 24, which precisely reflects the user input event.

Frame 24 generates a HTTP request including these text parameters, and sends that via HTTP to the URL therein.

It should be noted that the implementation of any logic needed for detecting the event and encoding the URL with the event parameters, is not realized in the mediator frame 24, but in the application frame 22. This way the script which does this detection and encoding, needs not to be reloaded each time an event happens, as the contents and scripts in the mediator frame are fully replaced after each HTTP request.

This is expressed in Figure as blocks 32 and 34 are shown in the application frame 22 and 38, 33, 35 are located in the mediator frame 24.

At the web application server 14 (Bottom part in FIG. 3) the request is received in block 40, and a server-side parameter evaluation logic parses and extracts the parameter values in parse block 42 and derives the user input therefrom in the application logic block 44. Then, the server application logic 44 processes this user input and calculates its response.

A script generation block 46 is provided. It generates a script that contains executable code, which when executed in block 35 implements the web application response within the frame 22 without loading the whole frame again from the web server 14. This newly displayed section of frame 22 serves as updated frame in order to be attended by the user, who may now do some more input, which is again sensed by sense logic 32. Thus, the loop may be reentered and all logic blocks depicted in FIG. 3 may be used again in a similar way.

Figure 4:
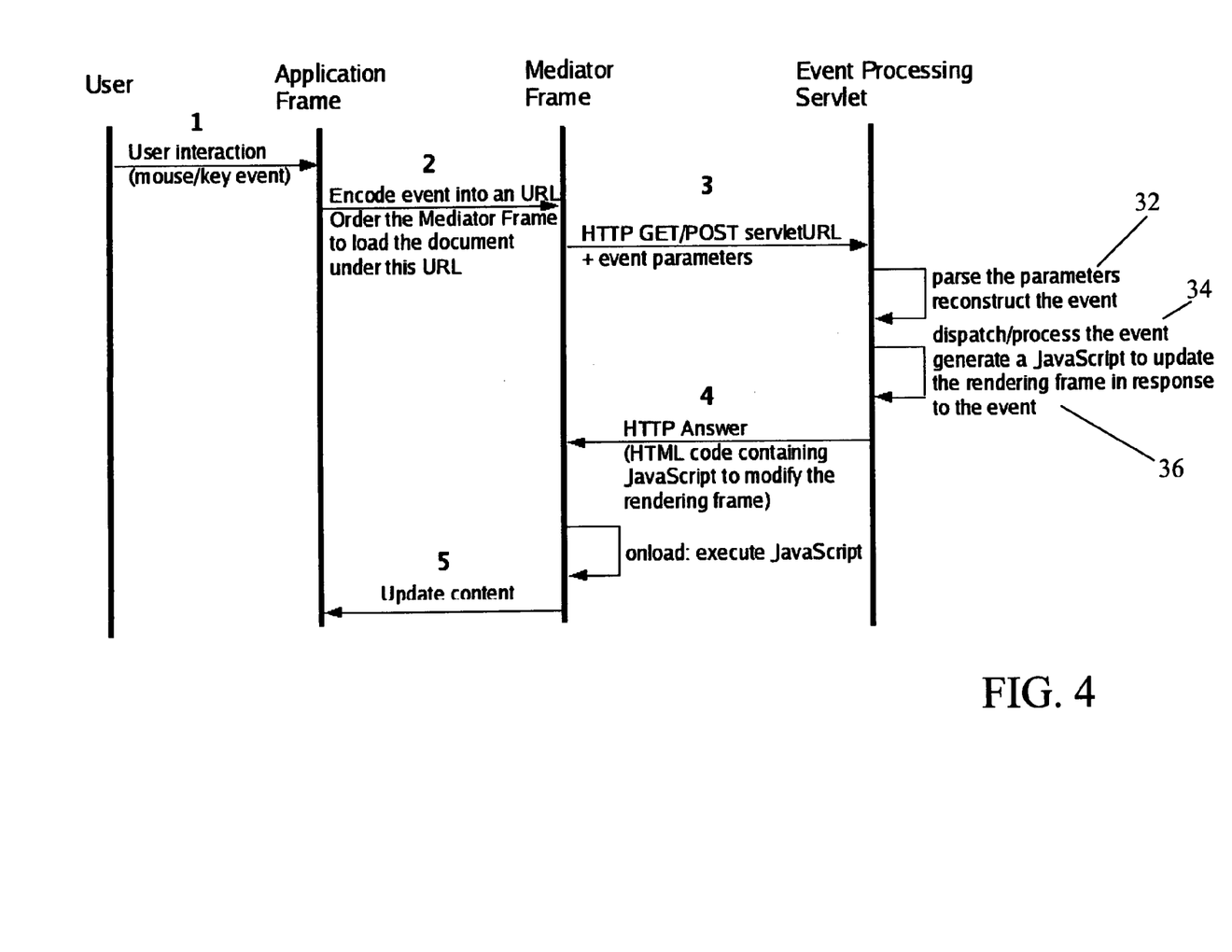
FIG. 4 is a schematic control flow diagram illustrating the inventional method run within a preferred embodiment of the invention.

With additional reference to FIGS. 2, 4 and 5 the control flow in the inventional method is described as follows:

Step 1: The user interacts with the application frame by producing a mouse or a key event.

Figure 5:
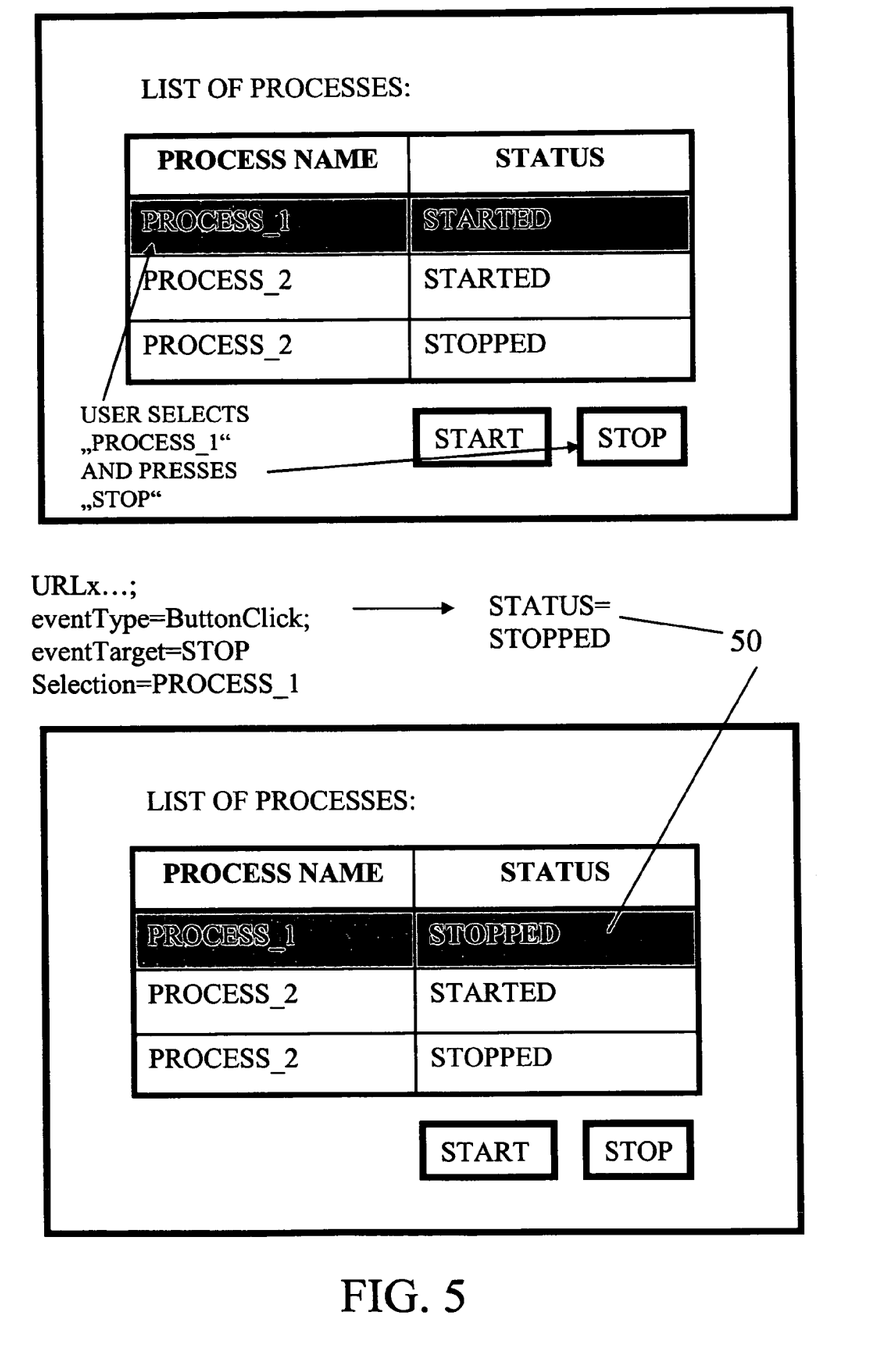
FIG. 5 is an exemplary schematic application frame representation illustrating the content-focussed communication between server and client.

Assume with reference to FIG. 5 top portion, a web application displaying in a table a list of processes and their respective status (started, stopped) and allowing the user to start or stop a process by selecting it in the table and pressing one of the two buttons START and STOP under the table. Assume a user selects the process "PROCESS_1" in the table and clicks on the button "STOP"

Step 2: a generic JavaScript 26 (FIG. 2), i.e the before-mentioned "first executable input-sensing programming means 26" represented by logic blocks 32 and 34 in FIG. 3 is embedded in the application frame 22, collects the mouse interactions in the above table and registers that finally the STOP button was clicked with the left mouse button. This ensemble of user actions is understood as an event. Said JavaScript 26 of the application frame detects this event, extracts its characteristics (i.e. type, target, key pressed, etc. . . .), encodes these characteristics as event-specific key-value pairs into a predetermined URL pointing to the servlet, and orders the Mediator Frame 24 to load the document corresponding to this URL.

In addition to above-mentioned alternative the following alternative for this step is added:

Instead of ordering the mediator frame 24 to send the request to the server, the application frame 22 can send this request itself, but with the additional information that the response has to be displayed in the Mediator Frame 24. This can be implemented for instance by using a hidden formula in the application frame that will send a HTTP POST request to the server. The HTML/JavaScript language makes it possible to specify that the document returned by the server has to be displayed in a different frame. The critical point here is that the response should not replace the document where the interaction occurred, but should always be displayed in the hidden mediator frame.

Step 3: The mediator frame 24 sends the HTTP request to the servlet 16, wherein this request contains the information about the user interaction detected on the application frame. That is, the characteristics, stored as key-value pairs (Event type is "ButtonClick", event target is button "STOP", table selection is "PROCESS_1"), are transferred as parameters in this request. This is meant to be understood as content-focussed, as the request basically contains solely above content.

Step 4: The servlet 16 at said web application server reads this information incoming at the specified URL, decodes this information, and computes a response to return according to the desired web application program logic. In this case the application processing may be assumed to include an enterprise database access, and some data processing in order to yield some response data to this user request. Also this may be implemented differently, for instance by pre-storing a number of JavaScripts and respective workflow response data if the respective enterprise workflow is appropriate.

Alternatively and program-depending, the response data may be calculated during runtime. The server response is again content-focussed, as the parameters transported in the server response basically contain content rather than GUI graphics—here the calculated response would be to change in the table the status text corresponding to "PROCESS_1" from "STARTED" to "STOPPED". This may be an HTML document containing a JavaScript 28 to be executed by the browser when the document is loaded by the browser. The Script contains the content. As it may be appreciated by the skilled reader, this content is only delta information 50, which is used to update the application frame 22 without loading it completely from the server.

Step 5: Once the response document is received by the mediator frame 24, the JavaScript JavaScript-MF 28 embedded therein, i.e the before-mentioned "first executable display programming means 28" is executed. This script modifies the document in the application frame by adding new elements, removing existing elements, or modifying properties of existing element. The rest of the document displayed in the application frame 22 needs not to be reloaded.

The present invention can be realized in hardware, software, or a combination of hardware and software. A web application according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation;

b) reproduction in a different material form.

The invention claimed is:

1. A method of updating a browser application frame, the method comprising:

monitoring a user input action within a browser application frame of a client-side web application user interface to detect a user event;

encoding control characteristics of the user event into an extension of a respective, predetermined Uniform Resource Locator (URL) addressing a server-side web application;

generating a request at the browser application frame displaying content, the request generated in response to the user event, wherein the request includes the URL and an instruction that is independent of the content displayed at the browser application frame;

instructing a user-hidden frame of the client-side web application to send the request to the server-side web application, receiving a predetermined server response comprising an executable display programming element at the user-hidden frame together with response parameters generated by the server-side web application; and executing the executable display programming element from within the user-hidden frame, wherein a predetermined portion of content displayed at the browser application frame is updated according to program logic of the server-side web application in response to executing the executable display programming element.

2. The method of claim 1, wherein the user-hidden frame sends the request to the server-side web application.

3. The method of claim 1, further comprising using the user-hidden frame as a user interface for displaying, within the browser application frame, web pages sent by the server-side web application.

4. The method of claim 1, further comprising generating the request within the browser application frame by converting events triggered by one or more user input actions within the browser application frame.

5. The method of claim 1, wherein the request comprises characteristics of the user input.

6. The method of claim 5, wherein the characteristics include event-specific key-value pairs.

7. The method of claim 6, wherein the event-specific key-value pairs are encoded into the predetermined Uniform Resource Locator that points to a servlet.

8. A method of interacting with a client-side web browser configured to execute a web application, the method comprising:
receiving, at a web-based client server from a browser application frame of the client-side web browser that is displaying content, a request generated by the browser application frame in response to user input, wherein the request includes a Uniform Resource Locator (URL), a first instruction that is generated in response to the user input and is independent of the content displayed at the browser application frame, and a second instruction to place a response to the request in a user-hidden frame of the client-side web browser;
decoding an appended URL extension to derive event control characteristics of the user input;
processing an event corresponding to the derived event control characteristics and according to server-side web application program logic;
generating a web application response document comprising response parameters generated by the web-based client server and representing a response of the web application program logic to the event, and an executable display program element dedicated for execution in the client-side web browser; and
sending the web application response document including the executable display programming element with response parameters generated by the web-based client server to a mediator frame to be placed in the mediator frame.

9. The method of claim 8, wherein the executable display programming element includes JAVASCRIPT code.

10. A web server computer system configured to execute a web application, the system comprising:
a memory storing program code; and
a processor configured to access the memory and execute the program code to:
evaluate request parameters and server application response data, wherein the request parameters are generated by an application frame of a client-side web browser that is displaying content in response to user input and are received at a server-side web application from the application frame, wherein the request parameters include a first instruction to place a response to a request in a hidden mediator frame associated with the application frame, and a second instruction that is generated in response to the user input and is independent of the content displayed at the application frame, wherein the hidden mediator frame is located at the client-side web browser,
select an executable display programming element based on the request parameters and the server application response data by:
decoding an appended Universal Resource Locator (URL) extension to derive event control characteristics of the user input;
processing an event corresponding to the derived event control characteristics and according to server-side web application program logic; and
generating a web application response document comprising response parameters generated by the server-side web application program logic and representing a response of the server-side web application program logic to the event, and an executable display program element dedicated for execution in the client-side web browser, and
send to the hidden mediator frame a server response comprising the server application response data and the executable display programming element, wherein the hidden mediator frame is configured to update only a portion of the application frame.

11. The web server computer system of claim 10, wherein the user input includes a button click, and wherein the application frame uses event characteristics descriptive of a screen position at which the button click occurred to generate the request.

12. The web server computer system of claim 10, wherein the request includes a Uniform Resource Locator.

13. A computer program stored within a memory and configured to be executed to perform a web application, wherein the computer program is executable to:
receive a request at a server-side web application, the request generated in response to user input at an application frame of a client-side web browser that is displaying content, the request including a first instruction to place a response to the request in a hidden mediator frame and a second instruction that is generated in response to the user input and is independent of the content displayed at the application frame;
decode an appended Universal Resource Locator (URL) extension to derive event control characteristics of the user input;
process an event corresponding to the derived event control characteristics and according to server-side web application program logic;
generate a web application response document comprising response parameters generated by the server-side web application program logic and representing a response of the server-side web application program logic to the event, and an executable display program element dedicated for execution in the client-side web browser; and
send the web application response document including the executable display programming element meters generated by the server-side web application to the hidden mediator frame.

14. The computer program of claim 13, wherein the application frame generates the request in response to a user action within the application frame.

15. A computer program product stored on a non-transitory computer usable medium, wherein the computer program product is executable to:
monitor a user input action within a browser application frame of a client-side web application user interface to detect a user event based on user input;
encode control characteristics of the user event into an extension of a respective, predetermined Uniform Resource Locator (URL) addressing a server-side web application;
generate a request, at an application frame of a client-side web browser that is displaying content, in response to user input, the request including a first instruction to place a response to the request in a hidden mediator frame and a second instruction that is generated in response to the user input and is independent of the content displayed at the application frame;
instructing the hidden mediator frame of the client-side web application to send the request to the server-side web application,
receive at the hidden mediator frame of the client-side web browser a predetermined server response comprising an executable display programming element and response parameters generated by the server-side web application; and cause the hidden mediator frame to update only a portion of the application frame according to program logic of the server-side web application in response to executing the executable display programming element.

* * * * *